United States Patent [19]

Ong et al.

[11] Patent Number: 4,959,288
[45] Date of Patent: Sep. 25, 1990

[54] PHOTOCONDUCTIVE IMAGING MEMBERS WITH DIARYL BIARYLYLAMINE COPOLYMER CHARGE TRANSPORT LAYERS

[75] Inventors: Beng S. Ong, Mississauga; Barkev Keoshkerian, Thornhill; Giuseppa Baranyi; Dasarao K. Murti, both of Mississauga, all of Canada

[73] Assignee: Xerox Corporation, Stamford, Conn.

[21] Appl. No.: 332,207

[22] Filed: Apr. 3, 1989

[51] Int. Cl.$^5$ .................................................. G03G 5/10
[52] U.S. Cl. .......................................... 430/59; 430/64; 430/96; 430/126
[58] Field of Search ................. 430/56, 58, 59, 73, 430/66, 96, 64

[56] References Cited

U.S. PATENT DOCUMENTS

| | | | |
|---|---|---|---|
| 3,567,450 | 3/1971 | Brantly et al. | 96/1.5 |
| 3,658,520 | 4/1972 | Brantly et al. | 96/1.6 |
| 4,025,341 | 5/1977 | Rule | 96/1.6 |
| 4,540,651 | 9/1985 | Fujimaki et al. | 430/72 |
| 4,606,988 | 8/1986 | Sasaki | 430/59 |
| 4,665,000 | 5/1987 | Tokoli | 430/59 |
| 4,725,518 | 2/1988 | Carmichael et al. | 430/58 |
| 4,769,302 | 9/1988 | Ueda | 430/59 |
| 4,801,517 | 1/1989 | Frechet et al. | 430/59 |
| 4,806,443 | 2/1989 | Yanus et al. | 430/56 |
| 4,806,444 | 2/1989 | Yanus et al. | 430/56 |
| 4,818,650 | 4/1989 | Limburg et al. | 430/59 |

*Primary Examiner*—John L. Goodrow
*Attorney, Agent, or Firm*—E. O. Palazzo; J. L. Byoriuk

[57] ABSTRACT

A photoconductive imaging member comprised of a photogenerating layer, and a charge transport layer comprised of diaryl biarylylamine copolymers of the formula

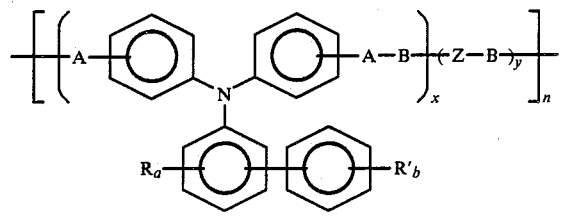

wherein A and B are independently selected from bifunctional linkages; Z is alkylenedioxy, arylenedioxy, or substituted derivatives thereof; R and R' are alkyl, aryl, substituted alkyl, substituted aryl, alkoxy, or halogen; x and y are mole fractions wherein x and y are greater than 0 and the sum of x and y is equal to 1.0; a and b are the numbers 0, 1 or 2; and n represents the number of monomer segments.

35 Claims, 1 Drawing Sheet

PHOTOCONDUCTIVE IMAGING MEMBERS WITH DIARYL BIARYLYLAMINE COPOLYMER CHARGE TRANSPORT LAYERS

BACKGROUND OF THE INVENTION

This invention is generally directed to photoconductive imaging members with organic polymers as charge transport components. More specifically, the present invention is directed to layered imaging members with organic charge transport components selected from diaryl biarylylamine-based charge transport polymers. The aforementioned charge transport polymers possess a number of advantages including excellent charge transporting characteristics; they are environmentally safe, non-hazardous and non-toxic; and their structural simplicities render their synthesis easily executable by economic processes. In addition, the charge transport polymers of the present invention can be utilized as a single-component transport layer, that is wherein a binder resin is not used in the transport layer of layered imaging devices. Single-component transport layers provide, for example, long-term structural stability since they are devoid of the problem of small molecule crystallization commonly associated with charge transport molecules-in-binder transport layers. In addition, the charge transport polymers illustrated herein enable photoconductive imaging members that can be selected for electrophotographic imaging and printing processes for an extended number of imaging cycles, while avoiding or minimizing charge transport molecule crystallization. The imaging members of the present invention are especially suitable for imaging and printing apparatuses wherein liquid developers are selected, primarily since a single-component transport layer can be utilized, that is a resin binder is not needed in this embodiment, and the polymer, or polymers illustrated herein are selected, thereby eliminating the problem of charge transport molecule leaching and bleeding when the imaging members are in contact with liquid developers. Furthermore, the charge transport polymers of the present invention possess acceptable solubility in common organic solvents such as halogenated, especially chlorinated hydrocarbons, tetrahydrofuran, toluene, xylene, and the like, thus enabling improved coatability thereof by various processes such as spray, dip, and draw-down coating techniques. In one embodiment of the present invention, the imaging member is comprised of a supporting substrate, a photogenerating layer, and in contact therewith a charge transport layer comprised of diaryl biarylylamine-based charge transport polymers optionally, but not preferably, dispersed in inactive resinous binders, such as the optional binders selected for the photogenerating layer including polycarbonates. The charge transport layer can be located as the top layer of the imaging member, or alternatively it may be situated between the supporting substrate and the photogenerating layer.

The formation and development of electrostatic latent images on the imaging surfaces of photoconductive materials by electrostatic means is well known. Numerous different photoconductive members for use in xerography are known such as selenium, alloys of selenium, layered imaging members comprised of aryl amine charge transport layers, reference U.S. Pat. No. 4,265,990, and imaging members with charge transport layers comprised of polysilylenes, reference U.S. Pat. No. 4,618,551. The disclosures of the aforementioned patents are totally incorporated herein by reference. However, the layered imaging members with transport layers incorporating the diaryl biarylylamine-based polymers of the present invention are, for example, economically more attractive in most instances than, for example, the members of the '790 and '551 patents in respect of material and fabrication costs, and possess the other advantages illustrated herein. Further, the diaryl biarylylamine-based charge transport polymers of the present invention can be synthesized from readily available inexpensive starting materials via cost-effective synthetic processes. Also, in regard to photochemical stability, the charge transport polymers of the present invention are superior to, for example, polysilylenes, and the aforementioned transport polymers do not photodegrade when exposed to ultraviolet radiations.

There are also known photoreceptor materials comprised of inorganic or organic materials wherein the charge carrier generation and charge carrier transport functions are accomplished by discrete contiguous layers. Additionally, photoreceptor materials are disclosed in the prior art which include an overcoating layer of an electrically insulating polymeric material and in conjunction with this overcoated type photoreceptor there have been proposed a number of imaging methods.

Specifically, layered photoresponsive devices including those comprised of photogenerating layers and transport layers are disclosed as indicated herein in U.S. Pat. No. 4,265,990, and overcoated photoresponsive materials containing a hole injecting layer overcoated with a transport layer, followed by an overcoating of a photogenerating layer and a top coating of an insulating organic resin, reference U.S. Pat. No. 4,251,612. Examples of generating layers disclosed in these patents include trigonal selenium and vanadyl phthalocyanine, while examples of the charge transport layer that may be employed are comprised of the aryldiamines as mentioned therein. The '990 patent is of particular interest in that it discloses layered photoresponsive imaging members similar to those illustrated in the present application with the exception that the charge transporting component of the members of the present invention are comprised of charge transport polymers of the formulas illustrated herein. These members can be utilized in an electrophotographic method by, for example, initially charging the member with an electrostatic charge and imagewise exposing to form an electrostatic latent image which can be subsequently developed to form a visible image. Other representative patents disclosing layered photoresponsive devices include U.S. Pat. Nos. 4,115,116; 4,047,949 and 4,081,274.

As a result of a patentability search there was located (1) U.S. Pat. No. 4,025,341 which discloses imaging members with photoconductive polymers comprised of the condensation products of a tertiary amine having at least two phenyl groups, and a carbonyl-containing compound of the formula as illustrated in column 3, with examples of condensation polymers being provided in column 4, reference Formula II, noting especially the polymers when $R_5$, $R_9$, and $R_{10}$ are each aryl(phenyl), however, it is believed that the polymers of the present invention are substantially different from those described in the '341 patent in that the invention polymers are polar charge transport polymers selected from, for example, the group consisting of polyesters, polycarbonates, polyurethanes and their copolymeric derivatives, while in contrast the polymers of U.S. Pat. No.

4,025,341 are nonpolar polymers whose backbones do not contain any carbonyl functions (C=O bond). Furthermore, the polymers of the present invention are formed from covalently linking suitable charge transport monomers via the C—O bonds rather than the C—C bonds as in the polymers of the '341 patent; (2) U.S. Pat. No. 4,725,518 which discloses imaging members wherein the charge transport layer is comprised of an aromatic amine compound and a protonic or Lewis acid; and (3) U.S. Pat. Nos. 3,567,450; 3,658,520; 4,025,341; 4,540,651; 4,606,988 and 4,769,302.

There is also disclosed in Belgium Patent No. 763,540 an electrophotographic member having at least two electrically operative layers, the first layer comprising a photoconductive layer which is capable of photogenerating charge carriers, and injecting the photogenerated holes into an active layer containing a transport organic material which is substantially nonabsorbing in the spectral region of intended use, but which is active and that allows injection of photogenerating holes from the photoconductive layer and allows these holes to be transported through the active layer. The active polymers may be mixed with inactive polymers or nonpolymeric materials. Also, there is disclosed in U.S. Pat. Nos. 4,232,102 and 4,233,383, the disclosures of which are totally incorporated herein by reference, the selection of sodium carbonate doped and barium carbonate doped photoresponsive imaging members containing trigonal selenium.

U.S. Pat. No. 4,869,988, and copending patent application U.S. Ser. No. 274,160, entitled, respectively, PHOTOCONDUCTIVE IMAGING MEMBERS WITH N,N-BIS(BIARYLYL)ANILINE, OR TRIS(BIARYLYL)AMINE CHARGE TRANSPORTING COMPONENTS, and PHOTOCONDUCTIVE IMAGING MEMBERS WITH BIARYLYL DIARYLAMINE CHARGE TRANSPORTING COMPONENTS, the disclosures of which are totally incorporated herein by reference, there are described layered photoconductive imaging members with transport layers incorporating biarylyl diarylamines, N,N-bis(biarylyl)anilines, and tris(biarylyl)amines as charge transport compounds. More specifically, in this application and patent there are disclosed improved layered photoconductive imaging members comprised of a supporting substrate, a photogenerating layer, optionally dispersed in an inactive resinous binder, and in contact therewith a charge transport layer comprised of the above-mentioned charge transport compounds, or mixtures thereof dispersed in resinous binders. Examples of specific charge transporting components disclosed in the U.S. Pat. No. 4,869,988 include N,N-bis(4-biphenylyl)-3,5-dimethoxyaniline (Ia); N,N-bis(4-biphenylyl)-3,5-dimethylaniline (Ib); N,N-bis(4-methyl-4′-biphenylyl)-3-methoxyaniline (Ic); N,N-bis(4-methyl-4′-biphenylyl)-3-chloroaniline (Id); N,N-bis(4-methyl-4′-biphenylyl)-4-ethylaniline (Ie); N,N-bis(4-chloro-4′-biphenylyl)-3-methylaniline (If); N,N-bis(4-bromo-4′-biphenylyl)-3,5-dimethoxyaniline (Ig); 4-biphenylyl bis(4-ethoxycarbonyl-4′-biphenylyl)amine (IIa); 4-biphenylyl bis(4-acetoxymethyl-4′-biphenylyl)amine (IIb); 3-biphenylyl bis(4-methyl-4′-biphenylyl)amine (IIc); 4-ethoxycarbonyl-4′-biphenylyl bis(4-methyl-4′-biphenylyl)amine (IId); and the like.

Examples of specific charge transporting compounds disclosed in copending application U.S. Ser. No. 274,160 include bis(p-tolyl)-4-biphenylylamine (IIa); bis(p-chlorophenyl)-4-biphenylylamine (IIb); N-phenyl-N-(4-biphenylyl)-p-toluidine (IIc); N-(4-biphenylyl)-N-(p-chlorophenyl)-p-toluidine (IId); N-phenyl-N-(4-biphenylyl)-p-anisidine (IIe); bis(m-anisyl)-4-biphenylylamine (IIIa); bis(m-tolyl)-4-biphenylylamine (IIIb); bis(m-chlorophenyl)-4-biphenylylamine (IIIc); N-phenyl-N-(4-biphenylyl)-m-toluidine (IIId); N-phenyl-N-(4-bromo-4′-biphenylyl)-m-toluidine (IVa); diphenyl-4-methyl-4′-biphenylylamine (IVb); N-phenyl-N-(4-ethoxycarbonyl-4′-biphenylyl)-m-toluidine (IVc); N-phenyl-N-(4-methoxy-4′-biphenylyl)-m-toluidine (IVd); N-(m-anisyl)-N-(4-biphenylyl)-p-toluidine (IVe); bis(m-anisyl)-3-biphenylylamine (Va); N-phenyl-N-(4-methyl-3′-biphenylyl)-p-toluidine (Vb); N-phenyl-N-(4-methyl-3′-biphenylyl)-m-anisidine (Vc); bis(m-anisyl)-3-biphenylylamine (Vd); bis(p-tolyl)-4-methyl-3′-biphenylylamine (Ve); N-p-tolyl-N-(4-methoxy-3′-biphenylyl)-m-chloroaniline (Vf); and the like.

The following patent applications and U.S. patents are mentioned: (1) U.S. Pat. No. 4,818,650 describes layered imaging members with novel polymeric, hydroxy and alkoxy aryl amines, wherein m is a number of between about 4 and 1,000, reference for example claims 1 and 2; (2) U.S. Ser. No. 061,247 now abandoned and U.S. Pat. No. 4,871,634 illustrate imaging members with novel dihydroxy terminated aryl amine small molecules, reference claims 1 and 2, for example; (3) U.S. Pat. No. 4,806,444, the disclosure of which is totally incorporated herein by reference, describes layered imaging members with novel polycarbonate polymeric aryl amines, reference claims 1 and 2, for example; (4) U.S. Pat. No. 4,806,443, the disclosure of which is totally incorporated herein by reference, illustrates novel polycarbonate polymeric amines useful in layered imaging members, reference claims 1 and 2, for example; and (5) U.S. Pat. No. 4,801,517, the disclosure of which is totally incorporated herein by reference, which discloses imaging members with novel polycarbonate aryl amines, reference claims 1 and 2, for example.

While imaging members with various charge transporting substances, including the aryl amines of the above mentioned U.S. patents are suitable for their intended purposes, there continues to be a need for improved members, particularly layered members, which are comprised of single-component transport layers of charge transport polymers, thereby ensuring the long-term stability of the members. Another need resides in the provision of layered imaging members that are compatible with liquid developer compositions. Further, there continues to be a need for layered imaging members wherein the layers are sufficiently adhered to one another to allow the continuous use of such members in repetitive imaging systems. Also, there continues to be a need for improved layered imaging members whose transport layers are devoid of the problems of transport molecule crystallization. Furthermore, there continues to be a need for charge transporting copolymers which are also useful as protective overcoating layers, and as interface materials for various imaging members. Additionally there is a need for charge transport compounds or copolymers that are nontoxic, and wherein such members are inert to the users thereof. A further need resides in the provision of novel efficient charge transport copolymers which are readily accessible synthetically from inexpensive commercial starting materials.

SUMMARY OF THE INVENTION

It is therefore an object of the present invention to provide layered photoresponsive imaging members with many of the advantages indicated herein.

It is also another object of the present invention to provide novel, efficient charge transport polymers which can function as single-component transport media, that is where a resin binder is avoided for layered photoconductive imaging members.

It is yet another object of the present invention to provide improved layered photoresponsive imaging members with copolymer charge transport layers in contact with a photogenerating layer, which members are suitable for use with liquid or dry developer compositions.

In a further object of the present invention there is provided an improved layered photoresponsive imaging member with a photogenerating layer situated between a supporting substrate, and a charge transport layer comprised of the charge transport polymers illustrated herein.

In yet another object of the present invention there is provided an improved photoresponsive imaging member comprised of a charge transporting copolymer layer situated between a supporting substrate and a photogenerating layer.

In another object of the present invention there are provided imaging and printing methods with the layered imaging members disclosed herein.

Another object of the present invention resides in the provision of charge transport polymers which are nontoxic and inert to the users of the devices within which they are incorporated.

A further object of the present invention is to provide improved layered imaging members which avoid the problem of transport molecule crystallization enabling their selection, for example, in imaging apparatuses with liquid developer compositions, and which members are insensitive to changes in environmental conditions, such as humidity.

In yet a further object of the present invention there are provided novel efficient charge transport copolymers which are readily accessible by simple synthetic processes.

A further object of the present invention resides in the provision of improved layered imaging members with a charge transport layer comprised of charge transport copolymers doped with charge transport small molecules, such as bis-(p-tolyl)-4-biphenylylamine, bis(m-anisyl)-4-biphenylylamine, N-phenyl-N-(4-biphenylyl)-p-toluidine, N-phenyl-N-(4-biphenylyl)-p-toluidine, N-phenyl-N-(4-biphenylyl)-m-anisidine, bis(m-tolyl)-4-biphenylylamine, and the like, enabling such devices to be utilized in very high speed, that is for example more than 135 copies per minute, copying and printing processes.

These and other objects of the present invention are accomplished by the provision of layered imaging members comprised of diaryl biarylylamine-based polymers. More specifically, the present invention is directed to layered imaging members comprised of photogenerating layers, and in contact therewith charge transport layers comprised of the diaryl biarylylamine-based polymers of Formula (I) as illustrated herein.

In one specific embodiment, the present invention is directed to an improved layered photoconductive imaging member comprised of a supporting substrate, a photogenerating layer comprised of organic or inorganic, photoconductive pigments, optionally dispersed in an inactive resinous binder, and in contact therewith a charge transport layer comprised of a diaryl biarylylamine-based polymer, or copolymers of the following Formula I, optionally doped with suitable charge transport small molecule compounds.

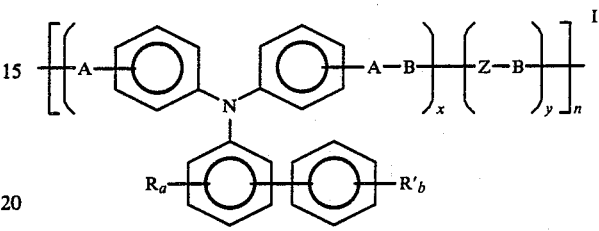

wherein A is independently selected from a bifunctional linkage such as —O—, alkyleneoxy with from, for example, a carbon chain length of from 1 to about 15 carbon atoms, and preferably from 1 to about 10 carbon atoms such as —OCH$_2$—, —OCH$_2$CH$_2$—, —OCH$_2$CH$_2$OCH$_2$CH$_2$—, aryleneoxy with from, for example, a carbon chain length of from 6 to about 24 carbon atoms, and preferably from 6 to about 20 carbon atoms such as —OC$_6$H$_4$—, alkylenedioxy with from, for example, a carbon chain length of from 1 to about 15 carbon atoms, and preferably from 1 to about 10 carbon atoms, such as —OCH$_2$CH$_2$O—, —OCH$_2$CH$_2$OCH$_2$CH$_2$O—, arylenedioxy with from, for example, a carbon chain length of from 6 to about 24 carbon atoms, and preferably from 6 to about 20 carbon atoms, such as —OC$_6$H$_4$O—, and the like; B is independently selected from the group of bifunctional linkages such as CO—R''—CO—, —COO—R''—OCO—, —CONH—R''—NHCO—, wherein R'' is alkylene with from, for example, a carbon chain length of from 1 to about 15 carbon atoms, or arylene with from, for example, a carbon chain length of from 6 to about 24 carbon atoms such as methylene, dimethylene, trimethylene, tetramethylene, pentamethylene, 2-methyltetramethylene, 3,3-dimethylpentamethylene, phenylene, tolylene, ether, or a polyether segment such as —CH$_2$CH$_2$OCH$_2$CH$_2$—, —(CH$_2$C-H$_2$O)$_2$CH$_2$CH$_2$—, and the like; Z is alkylenedioxy, arylenedioxy, substituted derivatives thereof containing from 2 to about 30 carbon atoms, such as trimethylenedioxy, tetramethylenedioxy, pentamethylenedioxy, phenylenedioxy, bis(oxyphenyl) propane, bis(oxyphenyl) cyclohexane, bis(oxyphenyl) methane, and the like; R and R' are independently selected from aliphatic and aromatic substituents, such as alkyl, aryl, alkoxy, aryloxy functions with from 1 to about 24 carbon atoms, halogen, such as chlorine, bromine, fluorine, and iodine; and the like; x and y are mole fractions with the provision that x and y are greater than 0; and that the sum of x+y is equal to 1.0; a and b are the numbers 0,1 or 2; and n is the number of monomer units ranging preferably from about 10 to about 300.

Specific examples of charge transporting copolymers include, but are not limited to, those represented by the following formulas:

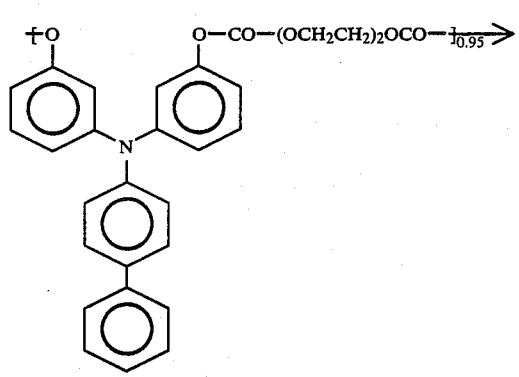
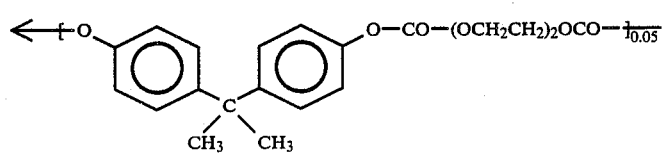
II
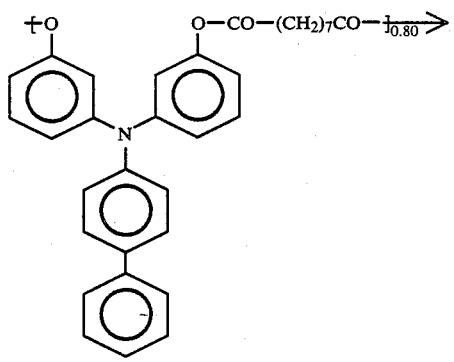
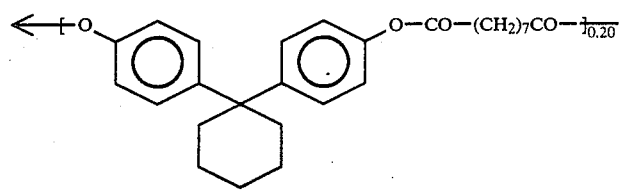
III
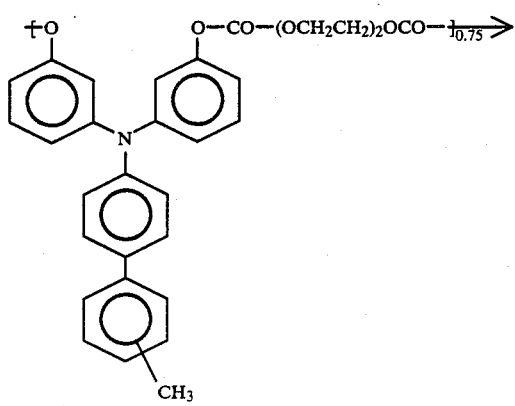
IV

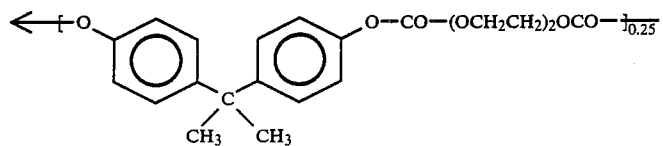
V
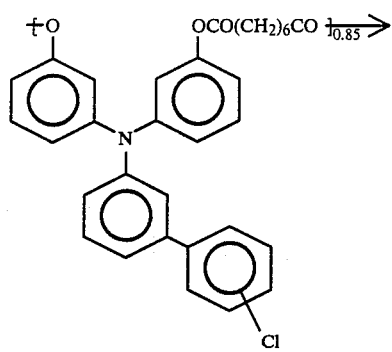
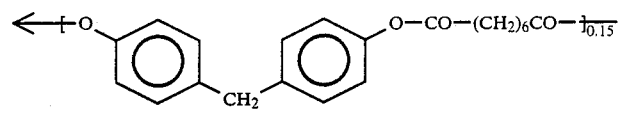
VI
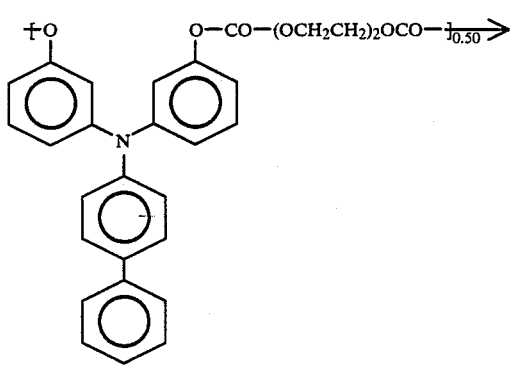
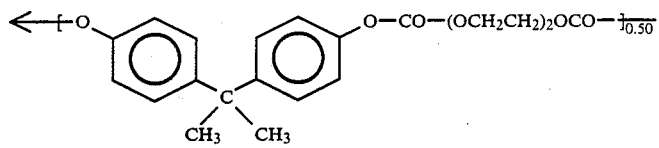
VII
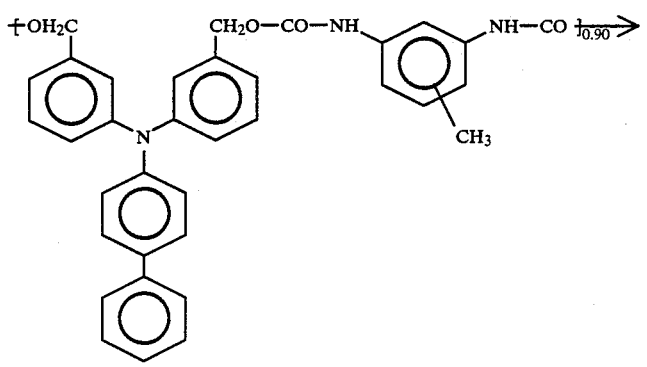

-continued

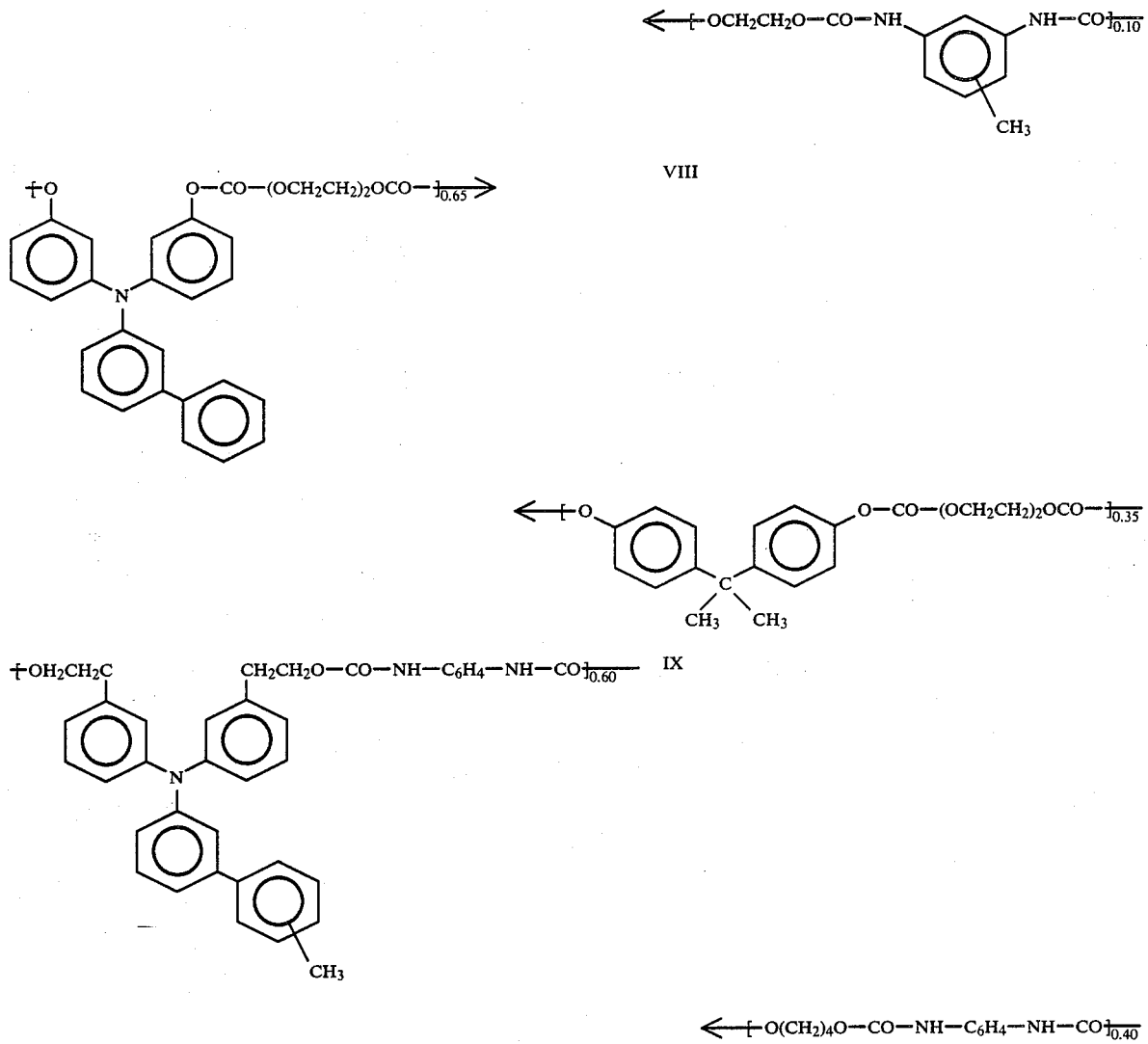

Examples of alkyl and alkoxy groups include those with from 1 carbon atom to about 25 carbon atoms, and preferably from about 1 carbon atom to about 8 carbon atoms, inclusive of methyl, methoxy, ethyl, ethoxy, propyl, propoxy, butyl, butoxy, pentyl, pentoxy, hexyl, octyl, octoxy, nonyl, nonoxy, decyl, decoxy, pentadecyl, stearyl, and other similar substituents. Specific preferred alkyl and alkoxy groups are methyl, methoxy, ethyl, ethoxy, propyl, propoxy, butyl and butoxy. Aryl and aryloxy include those with from about 6 to about 24 carbon atoms such as phenyl, phenoxy, naphthyl, and the like. Other examples of alkylene are those groups with from 1 to about 20 carbon atoms such as ethylene, propylene, butylene, hexylene, and the like.

The photoresponsive imaging members of the present invention can be prepared by a number of known methods, the process parameters and the order of the coating of the layers being dependent on the member desired. Thus, for example, the photoresponsive members of the present invention can be prepared by providing a conductive substrate with an optional charge blocking layer and an optional adhesive layer, applying thereto a photogenerating layer, and overcoating thereon a charge transport layer of the diaryl biarylylamine charge transport copolymer illustrated herein, optionally doped with from about 1 to about 20 percent by weight of charge transport molecules such as bis-(p-tolyl)-4-biphenylylamine, bis(m-anisyl)-4-biphenylylamine, N-phenyl-N-(4-biphenylyl)-p-toluidine, N-phenyl-N-(4-biphenylyl)-p-toluidine, N-phenyl-N-(4-biphenylyl)-m-anisidine, bis(m-tolyl)-4-biphenylylamine, and the like. The improved photoresponsive imaging members of the present invention can be fabricated by common known coating techniques such as by dip coating, wet coating, draw-down coating, or by spray coating process, depending largely on the type of imaging devices desired. Each coating, however, can be usually dried, for example, in a convection or forced air oven at a suitable temperature before a subsequent layer is applied thereto.

DETAILED DESCRIPTION OF THE INVENTION

Figure 1:
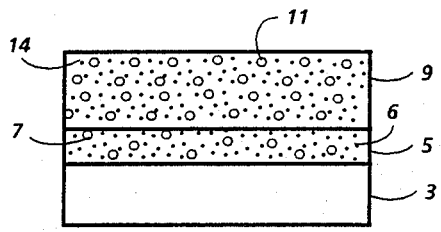
FIG. 1 represents a partially schematic cross-sectional view of a photoresponsive imaging member of the present invention.

Illustrated in FIG. 1 is a photoresponsive imaging member of the present invention comprising a 50 micron to 5,000 micron thick supporting substrate 3, a charge carrier photogenerating layer 5 of thickness of 0.1 micron to 5 microns comprised of a photogenerating pigment 6, optionally dispersed in inactive resinous binder composition 7, and a 5 micron to 60 micron thick charge transport layer 9 comprised of a diaryl biarylylamine copolymer of Formula I as illustrated herein as a charge transporting substance 11 optionally doped with 1 percent to 20 percent by weight of a suitable charge transport molecule 14, such as bis(m-tolyl) biphenylylamine, bis(m-anisyl) biphenylylamine, and the like. In an alternative embodiment of the present invention, and in further regard to FIG. 1, the charge transporting layer can be situated between the supporting substrate and the photogenerating layer.

Figure 2:
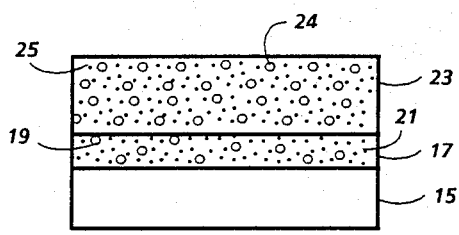
FIGS. 2 and 3 represent partially schematic cross-sectional views of photoresponsive imaging members of the present invention.

Illustrated in FIG. 2 is a photoresponsive imaging member of the present invention comprised of a conductive supporting substrate 15 of aluminized Mylar of a thickness of about 50 microns to 100 microns, a 0.5 micron to about 5 micron thick photogenerating layer 17 comprised of trigonal selenium photogenerating pigments 19 optionally dispersed in a resinous binder 21 in the amount of 10 percent to about 80 percent by weight, and a charge transport layer 23 comprised of the charge transport copolymers 24 of Formulas II, III, IV, V, VI, VII, VIII or IX optionally doped with 1 percent to 20 percent by weight of the charge transport molecule 25, such as bis(m-tolyl) biphenylylamine, or bis(m-anisyl) biphenylylamine primarily to enhance the transport efficiency of the transport layer.

Figure 3:
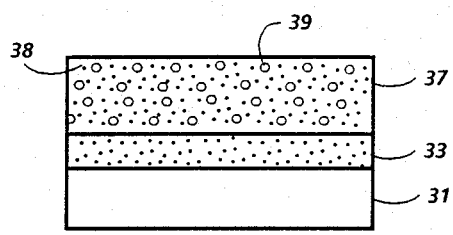

Another photoresponsive imaging member, reference FIG. 3, is comprised of a conductive supporting substrate 31 of aluminum of a thickness of 50 microns to about 5,000 microns, a photogenerating layer comprised of amorphous selenium or an amorphous selenium alloy 33, especially selenium arsenic, with 99.9 percent by weight of selenium, and selenium tellurium with from about 70 to about 85 percent by weight of selenium of thickness of 0.1 micron to about 5 microns, and a 10 micron to 50 micron thick charge transport layer 37 comprised of the charge transport copolymers 38 of Formulas II, III, IV, V, VI, VII, VIII or IX optionally doped with 1 percent to 20 percent by weight of a charge transport molecule 39.

Figure 4:
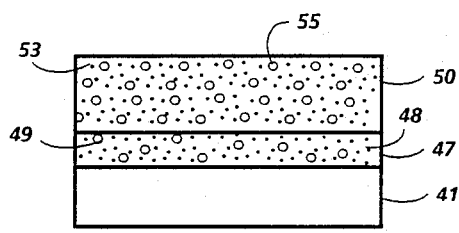
FIG. 4 represents a partially schematic cross-sectional view of a specific photoresponsive imaging member of the present invention wherein the charge transporting layer is situated between a supporting substrate, and the photogenerating layer.

Illustrated in FIG. 4 is a photoresponsive imaging member of the present invention comprised of a 25 micron to 100 micron thick conductive supporting substrate 41 of aluminized Mylar a 10 micron to 50 micron thick charge transport layer 47 comprised of the charge transport copolymers 48 of Formulas II, III, IV, V, VI, VII, VIII or IX optionally doped with 1 percent to about 20 percent by weight of a suitable charge transport molecule 49, such as bis(m-tolyl) biphenylylamine, or bis(m-anisyl) biphenylylamine, and a 0.5 micron to about 5 micron thick photogenerating layer 50 comprised of vanadyl phthalocyanine photogenerating pigments 53 optionally dispersed in a polyester resinous binder 55 (49,000 available from Goodyear Chemical) in the amount of 25 percent to 80 percent by weight.

The supporting substrate layers may be opaque or substantially transparent and may comprise any suitable material having the requisite mechanical properties. The substrate may comprise a layer of an organic or inorganic material having a conductive surface layer arranged thereon or a conductive material such as, for example, aluminum, chromium, nickel, indium, tin oxide, brass or the like. The substrate may be flexible or rigid and many have any of many different configurations such as, for example, a plate, a cylindrical drum, a scroll and the like. The thickness of the substrate layer is dependent on many factors including, for example, the components of the other layers, and the like; generally, however, the substrate is of a thickness of from about 50 microns to about 5,000 microns.

Examples of preferred photogenerating layer components, especially since they permit imaging members with a photosensitivity of from about 400 to about 700 nanometers, for example, include those comprised of known photoconductive charge carrier generating materials, such as amorphous selenium alloys, halogen doped amorphous selenium, halogen doped amorphous selenium alloys, trigonal selenium, mixtures of Groups IA and IIA, elements, selenite and carbonates with trigonal selenium, reference U.S. Pat. Nos. 4,232,102 and 4,233,283, the disclosures of each of these patents being totally incorporated herein by reference, copper, and chlorine doped cadmium sulfide, cadmium selenide and cadmium sulfur selenide and the like. Examples of specific alloys include selenium arsenic with from about 95 to about 99.8 weight percent selenium; selenium tellurium with from about 70 to about 90 weight percent of selenium; the aforementioned alloys containing halogens such as chlorine in amounts of from about 100 to about 1,000 parts per million; ternary alloys, and the like. The thickness of the photogenerating layer is dependent on a number of factors, such as the materials included in the other layers, and the like; generally, however, this layer is of a thickness of from about 0.1 micron to about 5 microns, and preferably from about 0.2 micron to about 2 microns depending on the photoconductive volume loading, which may vary from 5 percent to 100 percent by weight. Generally, it is desirable to provide this layer in a thickness which is sufficient to absorb about 90 percent or more of the incident radiation which is directed upon it in the imagewise exposure step. The maximum thickness of this layer is dependent primarily upon factors such as mechanical considerations, for example whether a flexible photoresponsive device is desired. Optional transport molecules suitable as dopants for the charge transport present, for example, in an amount of 1 percent to about 20 percent by weight are comprised, for example, of those illustrated in the aforementioned U.S. Pat. No. 4,869,988, and aforementioned copending application U.S. Ser. No. 274,160, the disclosures of which are totally incorporated herein by reference, such as bis(p-tolyl)-4-biphenylylamine, bis(p-chlorophenyl)-4-biphenylylamine, N-phenyl-N-(4-biphenylyl)-p-toluidine, N-(4-biphenylyl)-N-(p-chlorophenyl)-p-toluidine, N-phenyl-N-(4-biphenylyl)-m-anisidine, bis(m-anisyl)-4-biphenylylamine, bis(m-tolyl)-4-biphenylylamine, bis(m-chlorophenyl)-4-biphenylylamine, N-phenyl-N-(4-biphenylyl)-m-toluidine, N-phenyl-N-(4-bromo-4'-biphenylyl)-m-toluidine, and the like. Also, there may be selected as photogenerators, provided the objectives of the present invention are achieved, organic components such as squaraines, perylenes, reference for example U.S. Pat. No. 4,587,189, the disclosure of which is totally incorporated herein by reference, metal phthalocyanines, metal free phthalocyanines, vanadyl phthalocyanine, dibromoanthanthrone, and the like.

The transport layer is usually comprised of at least one of the charge transport polymers illustrated herein, which polymer or polymers may be optionally doped with suitable charge transport molecules to further improve the photosensitivity of the imaging members for very high speed copying and printing applications. The optional dopants, which are intended to further enhance the electrical performance of the imaging members, may be present in an amount of from about 1 to about 50 percent by weight, and preferably from about 1 percent to about 20 percent by weight. The thickness of this layer is, for example, from about 5 microns to about 50 microns with the thickness depending predominantly on the nature of intended applications, thus other thicknesses outside these ranges can be selected in some instances. In addition, a layer of adhesive material to promote the adhesion of the transport layer to the photogenerating layer can be utilized. This layer may comprise common known adhesive materials such as polyester resins, reference 49,000 polyester available from Goodyear Chemical Company, polysiloxane, acrylic polymers, and the like. A thickness of from about 0.001 micron to about 0.1 micron for this layer is generally employed. Hole blocking layers such as those derived from the polycondensation of aminopropyl trialkoxysilane or aminobutyl trialkoxysilane may optionally be introduced between the substrate and the photogenerating layer to improve the dark decay characteristics of the imaging member. Typically, this layer has a thickness of from about 0.001 micron to about 5 microns or more in thickness depending on the effectiveness with which this layer prevents the dark injection of charge carriers into the photogenerating layer.

The charge transporting diaryl biarylylamine copolymers of the present invention can be readily synthesized by the copolycondensation of stoichiometric quantities of a bifunctionalized monomer such as the corresponding dihydroxy derivatives and a suitable dihydroxy comonomer such as bisphenol A, bisphenol Z, and other similar bisphenols, with appropriate bifunctional reagents. The latter can be selected from the group consisting of diacyl halide such as adipoyl chloride, bishaloformates such as ethylene glycol bischloroformate or diethylene glycol bischloroformate, and diisocyanates such as benzene diisocyanate, toluene diisocyanate, and the like. For the charge transport copolyesters and copolycarbonates, the polymerization is conducted in an inert atmosphere at temperatures ranging from about 0° C. to about 40° C., and preferably from 10° C. to about 30° C., in the presence of an excess organic base such as triethylamine, tripropylamine, tributylamine, and the like. Typically, a slight excess of bishaloformate or diacyl chloride is employed to compensate for the propensity of the reagent to undergo hydrolysis, and about a 2 to 10 fold excess of the base is utilized. The polycondensation is carried out in a suitable solvent such as aliphatic halogenated and aromatic solvents including methylene chloride, ethyl acetate, tetrahydrofuran, dioxane, and the like. For the charge transport copolyurethanes, the reaction is accomplished with or without a catalyst in a suitable solvent such as dimethylsulfoxide, dimethylformamide, and the like, at temperatures ranging from ambient to about 80° C. The preferred catalyst for polyurethane preparation is di-n-butyltin dilaurate, although other catalysts such as di-n-butyltin disulfite, tri-n-butyltin acetate, ferric acetyl acetonate, triethylenediamine, triethylamine, and the like, can also be selected. The charge transport copolymers are usually isolated and purified by repeated precipitation of tetrahydrofuran solutions of said copolymers from a non-solvent such as methanol or water.

Examples of diacyl halides for the preparation of the charge transport copolyesters include succinyl chloride, glutaryl chloride, adipoyl chloride, pimeloyl chloride, 3-methyladipoyl chloride, suberoyl chloride, azelaoyl chloride, sebacoyl chloride, and the like. Examples of bishaloformates for the synthesis of the charge transport copolycarbonates include ethylene glycol bischloroformate, diethylene glycol bischloroformate, triethylene glycol bischloroformate, propylene glycol bischloroformate, butylene glycol bischloroformate, and the like. For the preparation of charge transport copolyurethanes, the diisocyanates that can be selected for the reaction include benzene diisocyanate, toluene diisocyanate, hexane diisocyanate, diphenylmethane diisocyanate, cyclohexane diisocyanate, and the like. Examples of dihydroxy comonomers include bis(p-hydroxyphenyl)methane, 2,2-bis(p-hydroxyphenyl)propane, 1,1-bis(p-hydroxyphenyl)cyclohexane, 1,4-xylene diol, ethylene glycol, diethylene glycol, and the like.

The diaryl biarylylamine-based charge transport copolymers of the present invention display very high hole mobility in the order of $10^{-5}$ cm$^2$/volts per second at an electric field of $2 \times 10^5$ volts/centimeter. Accordingly, layered imaging members incorporating the charge transport copolymers of the present invention exhibit excellent photosensitivity with a half-decay exposure sensitivity in the order of 1 to 3 ergs/cm$^2$, and possess very low dark decay characteristics, typically in the order of less than 20 volts/second. Also, the electrical characteristics of the aforementioned imaging members and imaging performance in some embodiments are equal to or superior to those exhibited by imaging members containing the aryl amine charge transport materials such as tritolylamine, substituted N,N,N',N'-tetraarylbenzidine, and the like. Also, the charge transport copolymers of the present invention are generally utilized as a single component with no resin binder, thereby ensuring the long-term stability of the transport layer. Imaging members with a single-component transport layer are especially suitable for use with liquid developer compositions without the problem of crystallization, bleeding or leaching of transport small molecules. As the transport layer of the present invention is transparent to the visible light, all or substantially most of the visible radiations used in the exposure reaches the photogenerating layer without noticeable loss. Also, the imaging members of the present invention possess high photosensitivity with a half-decay exposure sensitivity being in the range of 1.0 to about 3.0 ergs/cm$^2$ as indicated herein, very low residual potential of less than 50 volts, and cycling stability of over 10,000 cycles.

The following examples are being supplied to further define specific embodiments of the present invention, it being noted that these examples are intended to illustrate and not limit the scope of the present invention. Also, parts and percentages are by weight unless otherwise indicated.

EXAMPLE I

Synthesis of Bis(m-hydroxyphenyl)-4-Biphenylylamine

A mixture of 70.0 grams of m-iodotoluene, 7.0 grams of copper bronze powder, and 55 grams of potassium carbonate in 200 milliliters of Soltrol 220 was mechanically stirred and heated in a 300 milliliter round-bottomed flask fitted with a reflux condenser. When the temperature of the mixture reached 160° C., 16.9 grams of 4-aminobiphenyl was added, and the resulting reaction mixture was heated under reflux at 220° C. for two hours. At this stage, another mixture of 8.0 grams of potassium carbonate and 4.0 grams of copper bronze powder was added to the reaction mixture, and heating was continued at this temperature for another three hours. The hot reaction mixture was filtered, and the filtrate was cooled to room temperature, yielding an off-white precipitate. Recrystallization twice from isopropanol afforded 19.5 grams of analytically pure bis(m-anisyl)-4-biphenylylamine, and melting point (m.p.) of 98° C. to 98.5° C.

$^1$H-NMR (CDCl$_3$), δ (ppm): 3.75(s, 6H); 6.5 to 6.8(m, 6H); 7.1 to 7.6(m, 11H).

Elemental Analysis, Calculated for C$_{26}$H$_{23}$NO$_2$: C, 81.86; H, 6.08; N, 3.67. Found: C, 81.77; H, 6.09; N, 3.70.

A mixture of 9.06 grams of the obtained bis(m-anisyl)-4-biphenylylamine, and 21.5 grams of sodium iodide in 50 milliliters of sulfolane was heated to 120° C. in a round-bottomed flask with constant stirring. After 15 minutes of heating at this temperature, the mixture was cooled to about 70° C., and 0.35 milliliter of water was added. Subsequently, 18 milliliters of chlorotrimethylsilane was added over a period of 15 minutes. The resulting mixture was then heated for another 3.5 hours before pouring the mixture carefully into 600 milliliters of cold water with stirring. The crude solid product was filtered, dried, and purified by column chromatography on silica gel using a 1:50 mixture of acetone and methylene chloride as an eluent. The yield of pure bis(m-hydroxyphenyl)-4-biphenylylamine was 7.3 grams, m.p. of 176.5° C. to 178° C.

$^1$H-NMR (CDCl$_3$), δ (ppm): 4.55(s, 2H); 6.4 to 7.6(m, 17H).

Elemental Analysis, Calculated for C$_{24}$H$_{19}$NO$_2$: C, 81.56; H, 5.42; N, 3.96. Found: C, 81.43; H, 5.12; N, 4.03.

EXAMPLE II

Synthesis of Copolycarbonate (II)

A mixture of 2.85 grams of bis(m-hydroxyphenyl)biphenylylamine obtained from Example I and 0.1 gram of 2,2-bis(p-hydroxyphenyl)propane was dissolved in a mixture of 10 milliliters of methylene chloride and 3.5 milliliters of triethylamine in a round-bottomed flask under a nitrogen atmosphere. The resulting solution was cooled to about 10° C., and a solution of 2.1 grams of diethylene glycol bischloroformate in 3.0 milliliters of methylene chloride was added dropwise over a period of 20 minutes. After addition, the reaction mixture was stirred at room temperature for 3 hours before 2 milliliters of absolute ethanol and 1 milliliter of triethylamine were added. After stirring for another 1 hour, the reaction mixture was evaporated to dryness under reduced pressure. The residue was dissolved in 20 milliliters of tetrahydrofuran, and the resulting solution was added dropwise into 500 milliliters of water with constant stirring. The solid polymer was filtered, dried, dissolved in 20 milliliters of tetrahydrofuran, and precipitated from water as illustrated herein. Final purification was carried out by precipitating twice from 500 milliliters of methanol using 25 milliliters of tetrahydrofuran solution. The copolycarbonate of Formula II obtained was dried in vacuo at 60° C. overnight, and the yield was 3.7 grams. The number average molecular weight of the copolycarbonate (II) as determined by GPC analysis was 19,800 (relative to a polystyrene standard).

EXAMPLE III

Synthesis of Copolyester (III)

The preparation of the copolyester of Formula (III) was accomplished in accordance with the procedure of Example II with the exception that 2.40 grams of bis(m-hydroxyphenyl)biphenylylamine and 0.46 gram of 1,1-bis(p-hydroxyphenyl)cyclohexane were employed in place of the biphenylyl amine, and that 1.92 grams of freshly distilled azelaoyl chloride was used instead of diethylene glycol bischloroformate. In addition, the polymerization was carried out for 8 hours instead of 3 hours. The yield of copolyester (III) was 3.3 grams, and its number average molecular weight was 17,500.

EXAMPLE IV

Synthesis of Copolycarbonate (VI)

The preparation of copolycarbonate of Formula VI was accomplished in accordance with the procedure of Example II with the exceptions that a mixture of 1.5 gram of bis(m-hydroxyphenyl)biphenylylamine and 0.97 gram of 2,2-bis(p-hydroxyphenyl)propane was employed in place of the 2.85 grams of bis(m-hydroxyphenyl)biphenylylamine. The yield of copolycarbonate VI was 3.6 grams, and the number average molecular weight was 21,400.

EXAMPLE V

A layered photoresponsive imaging member with a hole transport layer comprised of the copolycarbonate II of Example II, and a photogenerating layer comprised of trigonal selenium was prepared as follows:

A photoresponsive imaging member was fabricated by providing an aluminized Mylar substrate in a thickness of 75 microns, followed by applying thereto with a multiple-clearance film applicator in a wet thickness of 0.5 mils, a layer of silane blocking layer derived from N-methyl-3-aminopropyl-trimethoxysilane (available from PCR Research Chemicals) in ethanol in a 1:20 volume ratio. This layer was dried for 5 minutes at room temperature, followed by curing for 10 minutes at 110° C. in a forced air oven. There was then applied to the silane layer a solution of 0.5 percent by weight of 49,000 polyester (Dupont Chemical) in a mixture of methylene chloride and 1,1,2-trichloroethane(4:1 volume ratio) with a multiple-clearance film applicator to a wet thickness of 0.5 mils. The layer was allowed to dry for one minute at room temperature, and 10 minutes at 100° C. in a forced air oven. The resulting adhesive layer had a dry thickness of 0.05 micron.

A dispersion of trigonal selenium and poly(N-vinylcarbazole) was prepared by ball milling 1.6 grams of trigonal selenium and 1.6 grams of poly(N-vinyl carbazole) in 14 milliliters each of tetrahydrofuran and toluene. Thereafter, 10 grams of the resulting slurry was then diluted with a solution of 0.25 gram of bis(m-anisyl)-4-biphenylylamine in 5 milliliters each of tetrahydrofuran and toluene. A 1.0 micron thick photogenerator layer was then fabricated by coating the above dispersion onto the adhesive layer present on the Mylar substrate with a multiple-clearance film applicator, followed by drying in a forced air oven at 135° C. for 5 minutes.

A solution for the hole transport layer was then prepared by dissolving 1.0 gram of copolycarbonate II in 7 milliliters of methylene chloride. This solution was then coated over the above photogenerator layer by means of a multiple-clearance film applicator. The resulting member was subsequently dried in a forced air oven at 130° C. for 30 minutes resulting in a 27 microns thick transport layer.

The fabricated imaging member was electrically tested by negatively charging it with a corona, and discharged by exposing to white light of wavelengths of from 400 to 700 nanometers. Charging was accomplished with a single wire corotron in which the wire was contained in a grounded aluminum channel and was strung between two insulating blocks. The acceptance potential of this imaging member after charging, and its residual potential after exposure were recorded. The procedure was repeated for different exposure energies supplied by a 75 watt Xenon arc lamp of incident radiation, and the exposure energy required to discharge the surface potential of the member to half of its original value was determined. This surface potential was measured using a wire loop probe contained in a shielded cylinder, and placed directly above the photoreceptor member surface. This loop was capacitively coupled to the photoreceptor surface so that the voltage of the wire loop corresponds to the surface potential. Also, the cylinder enclosing the wire loop was connected to the ground.

For the above prepared imaging member the acceptance potential was 1,000 volts, the residual potential was 10 volts, and the half decay exposure sensitivity was 2.5 ergs/cm$^2$. Further, the electrical properties of the above prepared photoresponsive imaging member remained essentially unchanged for 1,000 cycles of repeated charging and discharging.

EXAMPLE VI

A layered photoresponsive imaging member with a hole transport layer of the copolycarbonate of Formula II, reference Example II, and an amorphous selenium photogenerator layer was fabricated as follows:

A 0.5 micron thick layer of amorphous selenium on a ball grained aluminum plate substrate of a thickness of 7 mils (175 microns) was prepared by conventional vacuum deposition techniques. Vacuum deposition was accomplished at a vacuum of 10$^{-6}$ Torr, while the substrate was maintained at about 50° C. A hole transport layer in contact with and on top of the amorphous selenium layer was obtained by coating a solution of 1.0 gram of the copolycarbonate of Formula II in 6.5 milliliters of methylene chloride using a multiple-clearance film applicator with a wet gap of 8 mils. Thereafter, the resulting imaging device was dried in a forced air oven at 40° C. for 1 hour to form a 24-micron thick transport layer. Subsequently, the imaging member was cooled to room temperature, followed by electrical testing by repeating the procedure of Example V with the exception that a 450 nanometer monochromatic light was selected for irradiation. Specifically, this imaging member was negatively charged to 850 volts and discharged to a residual potential of 2 volts. The dark decay of this device was about 10 volts/second and the half decay exposure sensitivity was 2.4 ergs/cm$^2$. This device exhibited excellent cyclic stability, that is no noticeable degradation in electrical performance, for more than 10,000 cycles at which time the test was terminated.

EXAMPLE VII

An imaging member with a 10 micron-thick transport layer of the copolycarbonate of Formula II and 0.5 micron-thick amorphous selenium photogenerator layer was prepared in accordance with the procedure of Example VI with the exception that a wet gap of 5 mils was used to coat the transport layer.

The resulting imaging device was negatively charged to 850 volts, reference Example VI, and discharged using a 450 nanometer monochromatic light. The dark decay of this device was less than 15 volts/second; its residual voltage after exposure was about 2 volts, and its half decay exposure sensitivity was 2.6 ergs/cm$^2$.

EXAMPLE VIII

A layered photoresponsive imaging member with a hole transport layer of the copolycarbonate VI of Example IV, and an amorphous selenium photogenerator layer was fabricated as follows:

A 0.5 micron thick layer of amorphous selenium on a ball grained aluminum plate substrate of a thickness of 7 mils was prepared in accordance with the procedure of Example VI. A hole transport layer in contact with and on top of the amorphous selenium layer was obtained by coating a solution of 1 gram of the copolycarbonate of Formula VI in 10 milliliters of methylene chloride by means of a multiple-clearance film applicator. Thereafter, the resulting imaging member was dried in a forced air oven at 40° C. for 1 hour to form an 18 microns thick transport layer. Subsequently, the imaging member was cooled to room temperature, followed by electrical testing by repeating the procedure of Example V with the exception that a 450 nanometers monochromatic light was selected for irradiation. Specifically, this imaging member was negatively charged to 900 volts and discharged to a residual potential of 90 volts. The half decay exposure sensitivity for this member was 3.5 ergs/cm$^2$. The electrical performance of this imaging member remained essentially the same after 1,000 cycles of repeated charging and discharging.

EXAMPLE IX

A photoresponsive device with a transport layer of the copolycarbonate of Formula II, reference Example II, and a squarylium pigment as the photogenerator was prepared as follows:

A ball grained aluminum substrate was coated with a solution of 1 milliliter of 3-aminopropyltrimethoxysilane in 100 milliliters of ethanol. The coating was heated at 110° C. for 10 minutes resulting in the formation of a 0.1 micron thick polysilane layer. A dispersion of a photogenerator prepared by ball milling a mixture of 0.075 gram of bis(N,N'-dimethylaminophenyl)squaraine and 0.13 gram of Vitel PE-200 polyester (Goodyear) in 12 milliliters of methylene chloride for 24 hours was then coated on top of the above silane layer. After drying the coating in a forced air oven at 135° C. for 6 minutes, a 0.5 micron thick squarylium photogenerating layer was obtained.

A solution for the transport layer was prepared by dissolving 1.0 gram of the copolycarbonate of Formula II in 8 milliliters of methylene chloride. This solution was then coated over the above photogenerator layer using a multiple-clearance film applicator. The resulting device was dried in a forced air oven at 135° C. for 30 minutes resulting in a 22 microns thick transport layer.

Electrical testing was accomplished by repeating the procedure of Example V. Specifically, the above prepared imaging member was charged negatively to 1,000 volts and discharged with 830 nanometers monochromatic light. For this imaging device, the dark decay was less than 25 volts/second, and the half decay exposure sensitivity was 2.7 ergs/cm$^2$.

EXAMPLE X

A layered photoresponsive imaging member with a transport layer of the copolycarbonate of Formula II doped with bis(m-anisyl)-4-biphenylylamine, and a trigonal selenium photogenerator was prepared as follows:

An aluminized Mylar substrate of a thickness of 75 microns with a silane charge blocking layer and an adhesive layer was prepared in accordance with the procedure of Example V. A dispersion of trigonal selenium and poly(N-vinylcarbazole) was prepared by ball milling 1.6 grams of trigonal selenium and 1.6 grams of poly(N-vinylcarbazole) in 14 milliliters each of tetrahydrofuran and toluene. Thereafter, 10 grams of the resulting slurry was diluted with a solution of 0.25 gram of bis(m-methoxyphenyl)-4-biphenylylamine in 5 milliliters each of tetrahydrofuran and toluene. A 1.0 micron thick photogenerator layer was fabricated by coating the above dispersion onto the adhesive layer present on the above Mylar substrate using a multiple-clearance film applicator, followed by drying in a forced air oven at 135° C. for 5 minutes. A solution for the hole transport layer was then prepared by dissolving 0.15 gram of bis(m-anisyl)-4-biphenylylamine and 1.0 gram of the copolycarbonate of Formula II in 10 milliliters of methylene chloride. This solution was then coated over the photogenerator layer by means of a multiple-clearance film applicator. The resulting member was dried in a forced air oven at 130° C. for 30 minutes resulting in an 25 microns thick transport layer.

Electrical testing of the above prepared imaging member was then accomplished by repeating the procedure of Example V. Specifically, this imaging member was negatively charged to 1,100 volts and exposed to white light of wavelengths of 400 to 700 nanometers. The dark decay was less than 30 volts/second, and the half decay exposure sensitivity of this device was 2.3 ergs/cm$^2$. The electrical properties of this device remained substantially the same after 1,000 cycles of repeated charging and discharging.

Latent images may be developed on the above imaging members with known dry or liquid developers, including those illustrated in U.S. Pat. Nos. 4,298,672; 3,590,000; 4,560,635 and 4,797,342, the disclosures of which are totally incorporated herein by reference, and the like; subsequently transferring the image to a substrate such as paper and affixing the image thereto with, for example, heat.

Although the invention has been described with reference to specific preferred embodiments, it is not intended to be limited thereto, rather those skilled in the art will recognize variations and modifications may be made therein which are within the spirit of the invention and within the scope of the following claims.

What is claimed is:

1. A photoconductive imaging member comprised of a photogenerating layer, and a charge transport layer comprised of diaryl biarylylamine copolymers of the formula

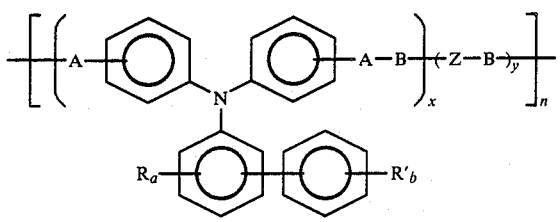

wherein A and B are independently selected from bifunctional linkages; Z is alkylenedioxy, arylenedioxy, or substituted derivatives thereof; R and R' are alkyl, aryl, substituted alkyl, substituted aryl, alkoxy, or halogen; x and y are mole fractions wherein x and y are greater than 0 and the sum of x and y is equal to 1.0; a and b are the numbers 0, 1 or 2; and n represents the number of repeating segments.

2. A photoconductive imaging member in accordance with claim 1 wherein A is —O—, B is —COO—R"—OCO—, wherein R" is alkylene, arylene, ether, or a polyether segment.

3. A photoconductive imaging member in accordance with claim 1 wherein A is alkyleneoxy.

4. A photoconductive imaging member in accordance with claim 1 wherein A is —O—, B is —CONH—R"—NHCO—, and Z is alkylenedioxy or arylenedioxy, wherein R" is alkylene or an arylene.

5. A photoconductive imaging member in accordance with claim 1 wherein x and y are mole fraction numbers of from 0.01 to 0.99.

6. A photoconductive imaging member in accordance with claim 2 wherein x and y are mole fraction numbers of from 0.01 to 0.99.

7. A photoconductive imaging member in accordance with claim 1 wherein R and R' are alkyl of from 1 to about 20 carbon atoms, or aryl of from 6 to about 24 carbon atoms.

8. A photoconductive imaging member in accordance with claim 1 wherein R or R' are selected from the group consisting of fluorine, chlorine, bromine, and iodine atoms.

9. A photoconductive imaging member in accordance with claim 1 wherein a and b are equal to 0.

10. A photoconductive imaging member in accordance with claim 1 containing a supporting substrate.

11. A photoconductive imaging member in accordance with claim 1 wherein the charge transport layer is comprised of the copolymers of Formulas II, III, IV, V, VI, VII, VIII or IX.

12. A photoconductive imaging member comprised of a supporting substrate; a photogenerating layer; and a charge transport layer comprised of diaryl biarylylamine copolymers of Formulas II, III, IV, V, VI, VII, VIII or IX.

13. A photoconductive imaging member in accordance with claim 1 wherein the photogenerating layer is comprised of organic, or inorganic photoconductive pigments.

14. A photoconductive imaging member in accordance with claim 13 wherein the photogenerating layer is comprised of a vanadyl phthalocyanine, squaraine, perylene, metal free phthalocyanines, metal phthalocyanines, dibromoanthanthrone photoconductive pigments, selenium, selenium alloys, or trigonal selenium.

15. A photoconductive imaging member in accordance with claim 11 wherein the photogenerating layer is comprised of selenium, selenium alloys, trigonal selenium, metal phthalocyanine, metal free phthalocyanines, perylenes, squaraines, vanadyl phthalocyanine, or dibromoanthanthrone.

16. A photoconductive imaging member in accordance with claim 12 wherein the photogenerating layer is comprised of selenium, selenium alloys, trigonal selenium, perylenes, squaraines, metal phthalocyanines, metal free phthalocyanines, vanadyl phthalocyanines or dibromoanthanthrone.

17. A photoconductive imaging member in accordance with claim 1 wherein the photogenerating layer is situated between the supporting substrate and the charge transport layer.

18. A photoconductive imaging member in accordance with claim 1 wherein the charge transport layer is situated between the photogenerating layer and the supporting substrate.

19. A photoconductive imaging member in accordance with claim 10 wherein the supporting substrate is comprised of a conductive component on an organic polymeric composition.

20. A photoconductive imaging member in accordance with claim 1 wherein the photogenerating pigment is dispersed in a resinous binder in an amount of from about 5 percent by weight to about 95 percent by weight.

21. A photoconductive imaging member in accordance with claim 20 wherein the resinous binder is a polyester, polyvinyl butyral, a polycarbonate, polyvinyl formal, or polyvinyl carbazole.

22. A photoconductive imaging member in accordance with claim 1 wherein the copolymer charge transport layer is doped with a hole transport molecule in an amount of from about 1 percent by weight to about 20 percent by weight.

23. A photoconductive imaging member in accordance with claim 1 containing a metal oxide charge blocking layer and an adhesive layer.

24. A photoconductive imaging member in accordance with claim 1 containing a polysilane charge blocking layer and an adhesive layer.

25. A method of imaging which comprises generating an electrostatic image on the imaging member of claim 1; subsequently transferring this image to a suitable substrate; and thereafter permanently affixing the image thereto.

26. A method of imaging which comprises generating an electrostatic image on the imaging member of claim 11; subsequently transferring this image to a suitable substrate; and thereafter permanently affixing the image thereto.

27. A method of imaging in accordance with claim 25 wherein the hole transport layer is comprised of a copolymer selected from the group consisting of copolymers of Formulas II, III, IV, V, VI, VII, VIII or IX.

28. Copolymers of formula

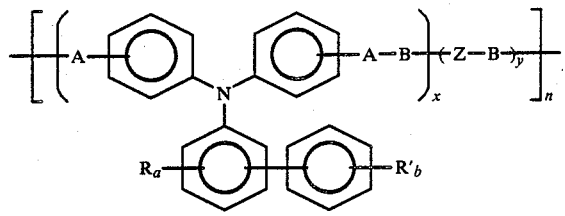

wherein A and B are independently selected from bifunctional linkages; Z is alkylenedioxy, arylenedioxy, or substituted derivatives thereof; R and R' are independently alkyl, aryl, substituted alkyl, substituted aryl, alkoxy, or halogen; x and y are mole fractions wherein x and y are greater than 0 and the sum of x and y is equal to 1.0; a and b are the numbers 0, 1 or 2; and n represents the number of repeating segments.

29. Copolymers of Formulas II, III, IV, V, VI, VII, VIII or IX.

30. A copolymer in accordance with claim 28 wherein A is —O—, B is —COO—R''—OCO—, wherein R'' is alkylene, arylene, ether, or a polyether segment.

31. A copolymer in accordance with claim 28 wherein R and R' are aliphatic aromatic substituents, or mixtures thereof.

32. A copolymer in accordance with claim 28 wherein A is alkyleneoxy.

33. A copolymer in accordance with claim 28 wherein A is —O—, B is —CONH—R''—NHCO—, and Z is alkylenedioxy or arylenedioxy, wherein R'' is alkylene or an arylene.

34. A copolymer in accordance with claim 28 wherein x and y are mole fraction numbers of from 0.01 to 0.99.

35. A photoconductive imaging member in accordance with claim 1 wherein R and R' are independently aliphatic, aromatic, or mixtures thereof.

* * * * *